United States Patent [19]
Jeong

[11] Patent Number: 5,483,264
[45] Date of Patent: Jan. 9, 1996

[54] APPARATUS FOR FLATTENING THERMOSENSITIVE RECORDING PAPER OF A FACSIMILE MACHINE

[75] Inventor: Seok J. Jeong, Seoul, Rep. of Korea

[73] Assignee: Goldstar Co., Ltd., Seoul, Rep. of Korea

[21] Appl. No.: 170,953

[22] Filed: Dec. 21, 1993

[30]    Foreign Application Priority Data

Dec. 21, 1992 [KR]    Rep. of Korea ............... 1992-25936

[51] Int. Cl.⁶ .................................................. G03G 15/00
[52] U.S. Cl. ............................................. 346/136; 355/309
[58] Field of Search ................................. 346/76, 76 PH, 346/136; 400/613, 592, 611, 618, 619; 355/309; 101/288; 358/296, 304; 74/470, 527, 142, 522, 527, 586, 828

[56]            References Cited

U.S. PATENT DOCUMENTS

| 3,389,401 | 6/1968 | Neff | 346/76 |
| 4,936,695 | 6/1990 | Ishii | 74/470 |
| 5,066,984 | 11/1991 | Coombs | 355/309 |

FOREIGN PATENT DOCUMENTS

| 62-175377 | 8/1987 | Japan . |
| 63-74862 | 4/1988 | Japan . |
| 63-13435 | 8/1989 | Japan . |

OTHER PUBLICATIONS

Kotasek, T. J. "Roll Feed Blousing Bail", Apr. 1982, *IBM Technical Disclosure Bulletin*, vol. 24, No. 11B.

*Primary Examiner*—Benjamin R. Fuller
*Assistant Examiner*—Raquel Yvette Gordon
*Attorney, Agent, or Firm*—Spencer, Frank & Schneider

[57]            ABSTRACT

This invention relates to an apparatus for flattening thermosensitive recording paper which is provided to carry out a flattening operation during reception only, comprising a motor, a lever rotatably connected to a main body, lever rotator for rotating the lever in positive direction during the facsimile machine is in a receiving state and in opposite direction during the facsimile machine is not in operation, and thermosensitive recording paper flattening part, interlocked with the lever, for exerting a flattening force in opposite direction to the direction of initial wound on the thermosensitive recording paper when the lever rotates in positive direction and releasing the flattening force when the lever rotates in the opposite direction.

5 Claims, 3 Drawing Sheets

APPARATUS FOR FLATTENING THERMOSENSITIVE RECORDING PAPER OF A FACSIMILE MACHINE

FIELD OF THE INVENTION

This invention relates to an apparatus for flattening thermosensitive recording paper, and more particularly to the apparatus for flattening thermosensitive recording paper, which is provided to carry out a flattening operation during reception only.

BACKGROUND OF THE INVENTION

In general, a facsimile machine is a machine which is used for transmission and reception of a content of paper which employs a roll of thermosensitive recording paper wound in one direction for use in reception.

In the past, the rolled recording paper has had a problem of being curled into the same direction as it has been wound, even after it has been drawn out and prepared or recorded upon.

In a few facsimile machines developed recently, a flattening apparatus which flattens recording paper to prevent curling in a direction opposite to the direction it has been wound is provided.

FIG. 1 shows such a conventional apparatus for flattening recording paper of a facsimile machine which includes a groove 34 positioned between a flatten roller 32 and a roll of thermosensitive paper 33. The apparatus further includes an underside plate 36, the lower end surface of which becomes juxtaposed with the surface of the groove 34 when a cover 35 which is rotatably hinged on a main body 31 of the machine, and on the underside of which the underside plate 36 is attached, is closed. A spring 38 is mounted on the underside of the cover 35 so that a thermal print head 37 can press the thermosensitive recording paper 33 against the flatten roller 32 when the cover 35 is closed.

When a reception signal is received, a motor (not shown) is activated causing power to be transmitted to the flatten roller 32 in the body 31 through a power transmission means. This causes the flatten roller 32 to rotate in a clockwise direction with respect to the paper to transfer the thermosensitive paper 33, thereby allowing the thermal print head 37 to print received signals on the thermosensitive recording paper.

When the thermosensitive recording paper 33 is being transferred, the thermosensitive paper 33 having been rolled in one direction is continuously unrolled equivalent to the transferred length. The thermosensitive recording paper 33 being transferred is flattened while the paper 33 passes through a V-shaped gap between the groove 34 on the body 31 and the underside plate 36 on the underside of the cover 35, so that the thermosensitive paper 33 can be transferred smoothly by the rotation of the flatten roller 32.

That is, although the thermosensitive recording paper is transferred unrolled from the roll, the thermosensitive recording paper always tends to roll again into the same direction as it had previously been rolled. The thermosensitive recording paper 33 being transferred with such a tendency passes through the approximate V shaped gap formed by the groove 34 on the body 31 and the underside plate 36 fixed on the cover 35, so that the thermosensitive recording paper 33 is transferred after being flattened by a flattening force exerted thereon by the underside plate 36 in a direction opposite to the initial direction of the wind.

However, in such an apparatus for flattening recording paper, the thermosensitive recording paper 33 between the groove 34 and the underside plate 36 stays in a V shape even if the machine is not in operation. Thus, after completion of a facsimile reception, the thermosensitive recording paper would have the tendency to be folded in a direction opposite to the initial direction of wind. When the machine goes unused for an extended period, the thermosensitive recording paper 33 transferred in a folded condition when the flatten roller 32 rotates in the next reception operation.

Thus, because the discharged paper is not smooth and possesses a V-shaped fold, the quality of the printed paper is low.

SUMMARY OF THE INVENTION

The object of this invention is to provide a apparatus for flattening the thermosensitive recording paper of a facsimile machine which can carry out printing well and can discharge the paper in an unfolded condition. This is accomplished by providing a flattening force which does not exert on the thermosensitive recording paper when the machine is not in operation, and which does exert force on thermosensitive recording paper when the machine is in operation, so that the transfer of the thermosensitive paper is smooth when the machine is operated again, even after a long period when the machine is being unused.

These and other objects and the features of this invention can be achieved by providing an apparatus for flattening thermosensitive recording paper of a facsimile machine comprising a motor, a lever rotatably connected to a main body, a lever rotating means for rotating the lever in a positive direction when the facsimile machine is in a receiving state and in opposite direction when the facsimile machine is not in operation. The apparatus further includes a thermosensitive recording paper flattening means, which is interlocked with the lever, the flattening means is adapted to exert a flattening force in the opposite direction of the initial wind on the thermosensitive recording paper when the lever rotates in positive direction. The flattening force is released when the lever rotates in the opposite direction.

BRIEF DESCRIPTION OF THE DRAWINGS

FIGS. 3(A) and 3(B) are longitudinal sections showing the operations of a apparatus for flattening thermosensitive recording paper of a facsimile machine in accordance with this invention in which FIG. 3(A) shows the longitudinal section when the machine is not in operation and FIG. 3(B) shows the longitudinal section when the machine is in reception operation.

DETAILED DESCRIPTION OF THE INVENTION

Figure 1:
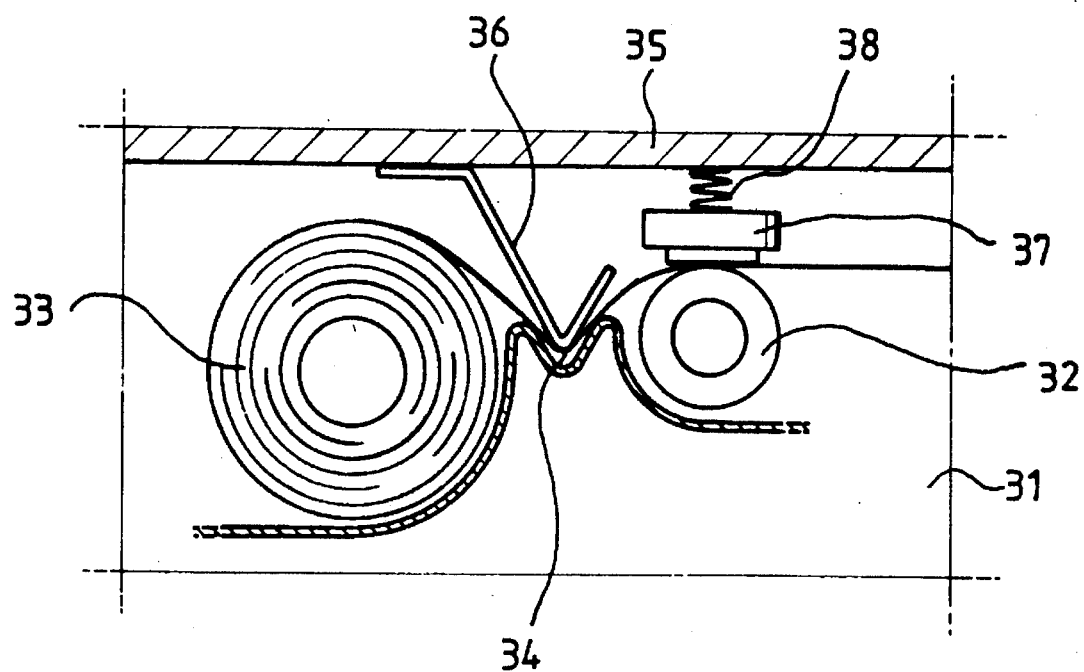
FIG. 1 is a schematic drawing showing a conventional apparatus for flattening thermosensitive recording paper of a facsimile machine.
Figure 2:
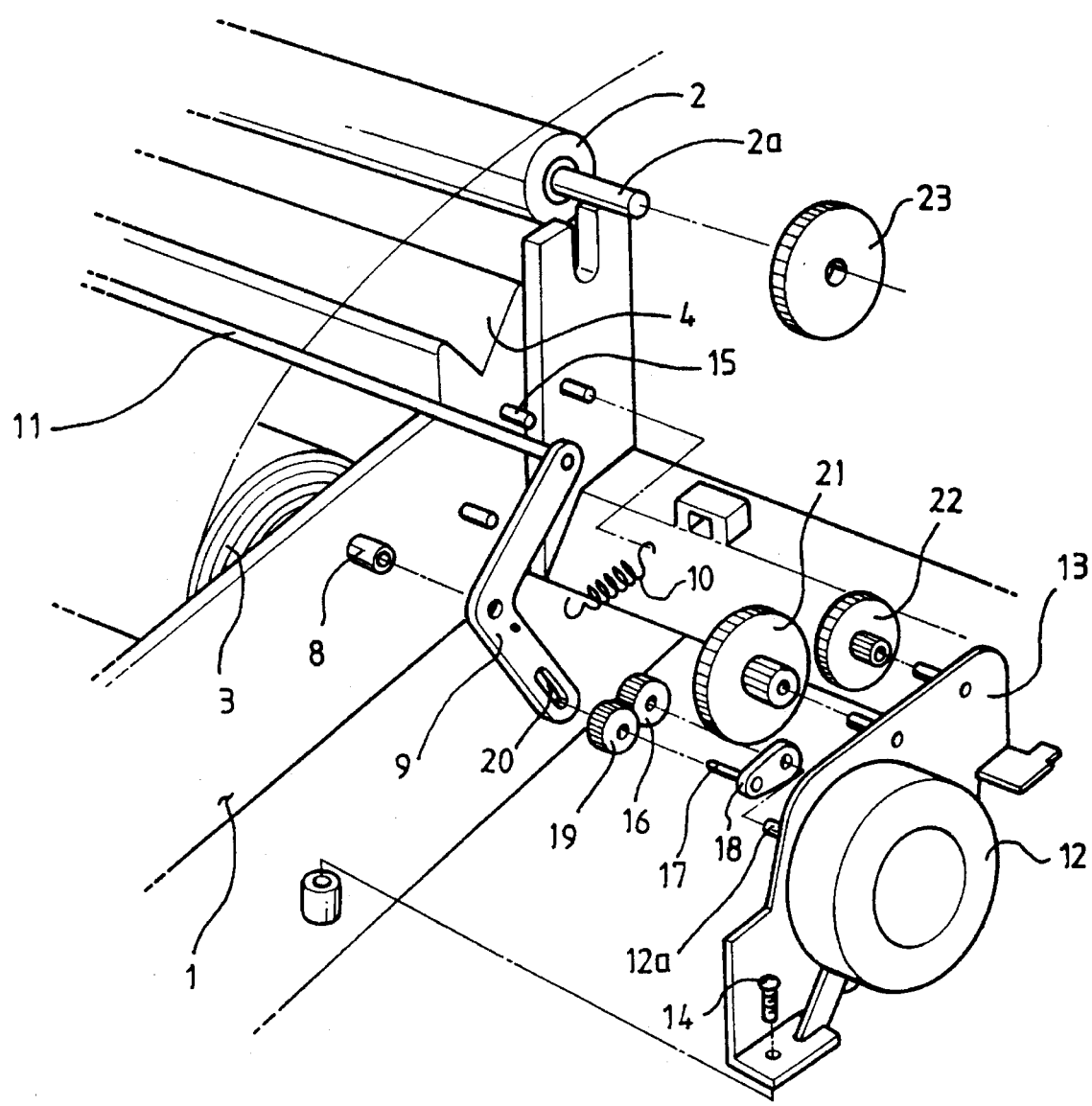
FIG. 2 is a disassembled perspective view of an apparatus for flattening thermosensitive recording paper of a facsimile machine in accordance with this invention.
Figure 3A:
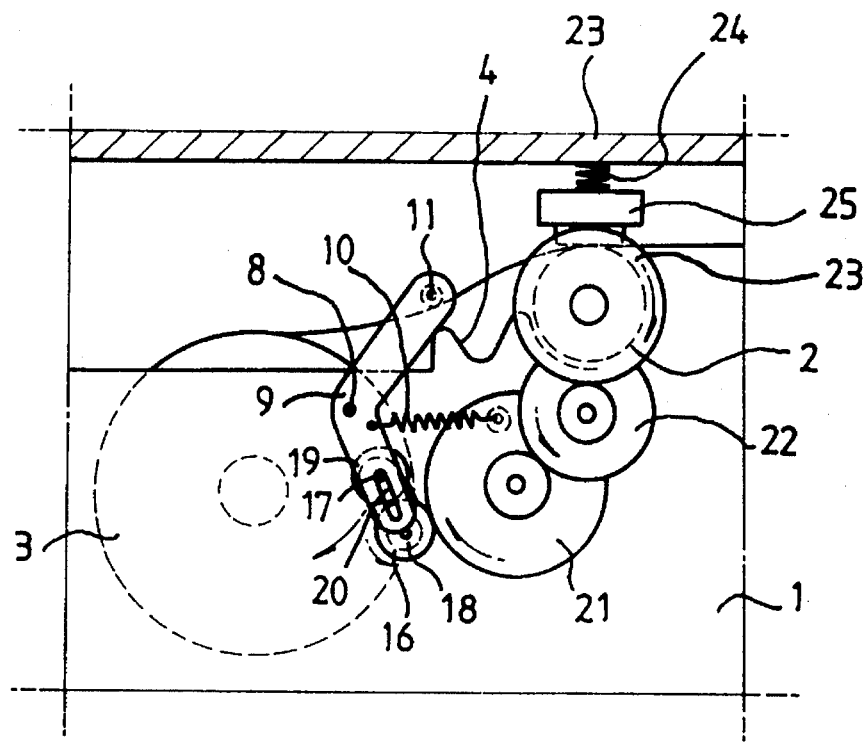
Figure 3B:
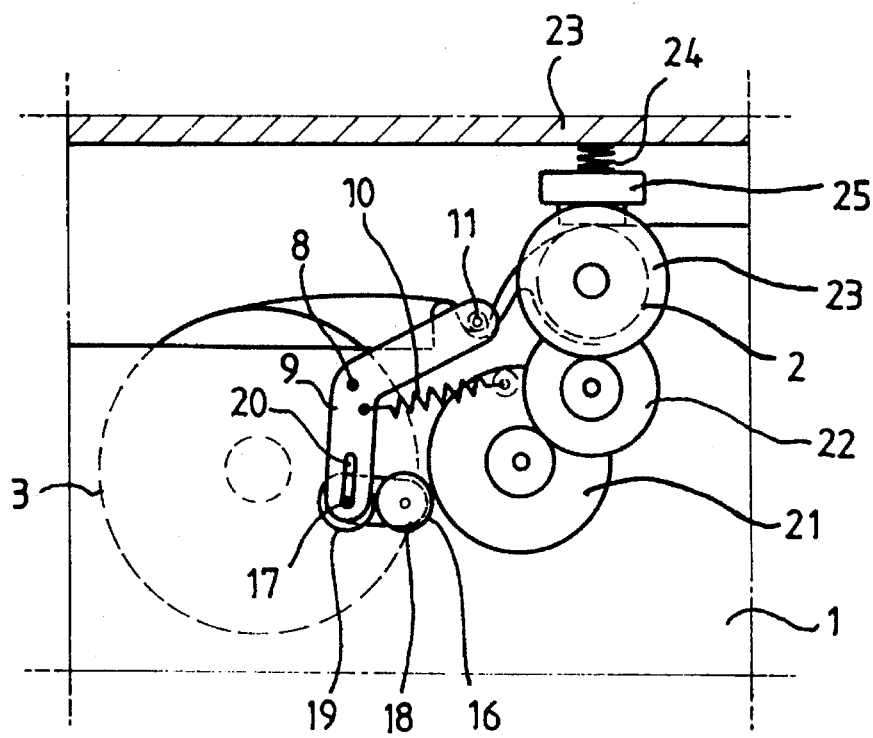

FIG. 2 and FIGS. 3(A) and 3(B) show an apparatus for flattening a thermosensitive recording paper of a facsimile machine in accordance with this invention, wherein a groove 4 is provided between a flatten roller 2 and a roll of the thermosensitive recording paper 3 inside of a main body 1. A thermal print head 25 is on the underside of a cover 5, which is rotatably hinged with the main body 1 and positioned to contact with the flatten roller 2 pressed by a spring 24. A motor 12 is fixed on a bracket 13 which is fixed on the main body 1 by screws 14. A driving gear 16 is fixed on a shaft 12a of the motor 12 and rotated thereby. A rotating piece 18 is rotatably inserted into the shaft 12a of the motor 12 in one end and fixed on a hinge shaft 17 in the other end. A follower gear 19 is rotatably mounted on the hinge shaft 17 to engage with the driving gear 16. A lever 9, rotatably mounted on a boss 8 formed in one side of the outside of the main body 1, is forced by a spring 10 in a counter clockwise direction with respect to the paper. The lever 9 is fixed with the shaft 11 in the upper end and formed with an elongated hole 20 in the lower end. The elongated hole 20 is movably inserted with the hinge shaft 17 of the rotating piece 18, so that the lever 9 can rotate in a clockwise direction when the hinge shaft 17 moves down to the lower end of the elongated hole 20. A in counter clockwise direction when the hinge shaft 17 is guided to the upper end of the elongated hole 20. A stopper 15 is provided to prevent excessive rotation of the lever 9 when the lever 9 rotates in the opposite direction by stopping the lever 9 when the lever 9 contacts with the stopper 15. The apparatus further includes a first reduction gear 21 engaged with the driving gear 16 and, a second reduction gear 22 which is engaged with both the first reduction gear 21, and a flatten gear 23 fixed on a shaft 2a of the flatten roller 2.

The operation and the advantages of this invention described above is explained hereinafter.

When a reception signal is received, the motor 12 rotates the driving gear 16 in counter clockwise direction facing the paper, which rotational force is transmitted to the flatten gear 23 through the first reduction gear 21 and the second reduction gear 22, so that the flatten roller 2 rotating in a clockwise direction facing the paper transfers the thermosensitive recording paper. The paper transfer occurs when the thermal print head 25 mounted on the underside of the cover 5, presses the thermosensitive recording paper 3 against the flatten roller 2, to carry out printing of the received signal on the thermosensitive recording paper 3.

When the thermosensitive recording paper 3 is transferred, the roll of the thermosensitive paper wound in one direction is unrolled continuously as much as is transferred. When the driving gear 16 is rotated in a counter clockwise direction, the follower gear 19 engaged with the driving gear 16 is rotated in a clockwise direction and the rotating piece 18 on the shaft 12a of the motor 12 rotates in a counter clockwise direction. When the end of the hinge shaft 17, being guided to the elongated hole 20 formed in the lower part of the lever 9, is moved to the lower end of the elongated hole 20, the lever 9 rotates on the boss 8 in a clockwise direction against the force of the spring 10 acting in a counter clockwise direction.

When the lever 9 rotates in a clockwise direction, the shaft 11 at the upper end of the lever which presses down the thermosensitive recording paper 3, moves into the groove 4, so that the thermosensitive recording paper 3 forms a V shape between the groove 4 and the shaft 11 in opposite direction to the direction of initial wind. This makes the flattening force exert in an opposite direction to the direction of initial wind, so that the thermosensitive recording paper 3 is flattened and is transferred smoothly according to the rotation of the flatten roller 2.

On completion of reception, the motor 12 stops after a certain number of reverse revolutions. The lever 9, following the reverse process to the process explained above, rotates in the opposite direction(counter clockwise direction with respect to the paper) so as to return the shaft 11 at the upper end of the lever 9 to the initial position, so that the thermosensitive recording paper 3 is released from the flattening force leaving the thermosensitive recording paper 3 free.

In this time, the spring 10 keeps pressing the lever 9 to counter clockwise direction.

The reverse rotation of the lever 9 is maintained only until the lever 9 is caught by the stopper 15 formed on the main body 1.

As explained herein before, this invention allows good printing condition as well as no folding of the discharged thermosensitive recording paper by exerting a flattening force on the thermosensitive recording paper, in the direction opposite to the direction of initial wind, only during facsimile reception. This allows the thermosensitive recording paper to be transferred smoothly, without any fold in next reception, even when the facsimile machine is not used for an extended period.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An apparatus for flattening thermosensitive recording paper of a facsimile machine which is capable of sending and receiving facsimile signals comprising:

a housing;

a recording head;

means for accommodating a roll of thermosensitive recording paper within said housing, said paper having a direction of initial wind;

a lever rotatably connected to the housing;

lever rotating means for causing the level to be rotated to a first position when the facsimile machine is receiving a facsimile signal and to an opposite position when the facsimile machine is not receiving a facsimile signal;

thermosensitive recording paper flattening means interlocked with the lever for exerting a flattening force in an opposite direction to the direction of initial wind on the thermosensitive recording paper when the lever is in said first position and releasing the flattening force when the lever is in said opposite position;

a motor having a shaft and being operably associated with said lever rotating means; and a groove positioned between the thermosensitive recording paper accommodating means and the recording head, whereby during reception of said signal, the paper is pressed within the groove so as to flatten the paper.

2. An apparatus as claimed in claim 1, wherein the lever rotating means includes:

a driving gear fixed on a shaft of the motor and driven by the motor wherein said motor provides rotational force to said driving gear;

a hinge shaft;

a rotating piece rotatably connected to the shaft of the motor on a first end and fixed on said hinge shaft on a second end opposing said first end;

a follower gear, mounted on the hinge shaft so as to be coupled with the driving gear, for rotating the rotating piece, together with the driving gear by the rotational force of the driving gear; and an elongated hole having an upper part and a lower part, formed in a lower part of the lever, for guiding the hinge shaft whereby the lever is caused to rotate to said first position when the hinge shaft of the rotating piece moves down toward the lower part of the elongated hole and to a second position opposite said first position when the hinge shaft moves up toward the upper part of the elongated hole.

3. The apparatus of claim 1, wherein said apparatus further includes a spring means for engaging said lever, said spring means being adapted to provide resilient support for said lever.

4. The apparatus of claim 1, wherein said apparatus further includes a stopper connected to the housing, said stopper being adapted to prevent excessive rotation of the lever when the lever is rotated to said opposite position.

5. The apparatus of claim 1 wherein said groove is V-shaped.

\* \* \* \* \*